(12) United States Patent
Cohen

(10) Patent No.: US 6,356,941 B1
(45) Date of Patent: Mar. 12, 2002

(54) NETWORK VAULTS

(75) Inventor: Alon Cohen, Modi'In (IL)

(73) Assignee: Cyber-Ark Software Ltd., Or-Yehuda (IL)

( * ) Notice: Subject to any disclaimer, the term of this patent is extended or adjusted under 35 U.S.C. 154(b) by 0 days.

(21) Appl. No.: 09/253,780

(22) Filed: Feb. 22, 1999

(51) Int. Cl.[7] .............................................. G06F 15/16
(52) U.S. Cl. ...................... 709/219; 713/201; 713/186; 713/168; 713/176
(58) Field of Search ................................ 709/204, 219, 709/217, 225, 216, 213; 713/201

(56) References Cited

U.S. PATENT DOCUMENTS

| | | | | |
|---|---|---|---|---|
| 5,007,083 A | * | 4/1991 | Constant | 713/194 |
| 5,191,611 A | * | 3/1993 | Lang | 705/53 |
| 5,550,976 A | * | 8/1996 | Henderson et al. | 709/206 |
| 5,719,938 A | * | 2/1998 | Haas et al. | 705/52 |
| 5,752,031 A | * | 5/1998 | Cutler et al. | 709/103 |
| 5,862,346 A | * | 1/1999 | Kley et al. | 709/243 |
| 5,864,683 A | * | 1/1999 | Boebert et al. | 709/249 |
| 5,875,296 A | * | 2/1999 | Shi et al. | 713/202 |
| 5,889,958 A | * | 3/1999 | Willens | 709/229 |
| 5,892,917 A | * | 4/1999 | Myerson | 709/224 |
| 5,911,045 A | * | 6/1999 | Leyba et al. | 709/204 |
| 5,913,041 A | * | 6/1999 | Ramanathan et al. | 709/233 |
| 5,969,632 A | * | 10/1999 | Diamant et al. | 340/825.32 |
| 6,009,475 A | * | 12/1999 | Shrader | 709/249 |
| 6,018,745 A | * | 1/2000 | Kuftedjian | 707/200 |
| 6,021,497 A | * | 2/2000 | Bouthillier et al. | 713/202 |
| 6,026,463 A | * | 2/2000 | Klein | 711/4 |
| 6,052,785 A | * | 4/2000 | Lin et al. | 713/201 |
| 6,061,798 A | * | 5/2000 | Coley et al. | 713/201 |
| 6,098,056 A | * | 8/2000 | Rusnak et al. | 705/75 |
| 6,105,042 A | * | 8/2000 | Agonovic et al. | 707/500 |
| 6,105,131 A | * | 8/2000 | Carroll | 713/155 |
| 6,163,859 A | * | 12/2000 | Lee et al. | 714/38 |
| 6,182,222 B1 | * | 1/2001 | Oparaji | 713/200 |

FOREIGN PATENT DOCUMENTS

EP 0043027 A1 * 1/1982 .............. H04L/9/00

OTHER PUBLICATIONS

Davis, B., Web Security Help, Informationweek, Jun. 15, 1998, p. 143.*

* cited by examiner

Primary Examiner—Glenton B. Burgess
Assistant Examiner—Bradley Edelman
(74) Attorney, Agent, or Firm—Mark M. Friedman

(57) ABSTRACT

A system for secure data storage, exchange and/or sharing through a protected central storage facility, containing at least one "network vault" to which access is controlled through a single data access channel. The network vault is similar to a physical safe, in that substantially any type of information can be stored in the network vault, and in that the user need only place the information inside the network vault for the information to be secured. Thus, the system of the present invention combines the flexibility of data storage and retrieval through a network, with the security of controlled access for data storage and retrieval at a fixed physical location. The restriction of data access through a single data access channel greatly simplifies the task of protecting access to the data, since only this single channel must be monitored for unauthorized access, rather than monitoring many such channels (or interfaces). Also, the present invention enables data to be exchanged between two users and/or networks which do not trust each other, again by only permitting access to the stored data through the single data access channel, rather than by attempting to filter communication between the two parties. Thus, the present invention is able to provide security without declarations, since the data is moved into the security system, rather than attempting to impose the security system over an existing data access system.

32 Claims, 5 Drawing Sheets

BLOCK DIAGRAM OF CLIENT

NETWORK VAULTS

FIELD AND BACKGROUND OF THE INVENTION

The present invention relates to a system and method for providing secure storage and transaction facilities for electronically stored data in a computer networking environment, and in particular, to such a system and method in which access to the facility is controlled by the owner of the information.

The security of information is extremely important for modern society, particularly since the advent of the Internet. Unauthorized exposure of such information, and/or unintended or unauthorized use of information may significantly damage organizations and individuals. Damage may also be caused by lost, corrupted or misused information. Thus, appropriate security measures are required in order to protect information from such damaging actions, while still maintaining the availability of such information to authorized individuals and/or organizations.

The mode of storage for information significantly alters the security measures required to protect the information. For example, information which is written on paper can be physically protected through storage in a physical safe. Such a physical safe is a device which contains the paper, thereby preventing unauthorized access to the information, and hence preventing unauthorized or unintended exposure or use of the information.

Physical safes have the advantage of ease of implementation and use, but have the drawback of being restricted to one physical location, such that the user must be physically present in the same location as the safe in order to access the information. Currently, flexibility and ease of access to information are highly valued, particularly through the Internet and organizational intranets, which provide connections between computers through a network. Accessing information through a network enables users at physically separate locations to share information, but also increases the possibility of unauthorized or unintended access to the information. Various attempts to provide a solution to the problem of security for electronically stored information are known in the art, but all of these attempted solutions have various drawbacks. For example, each solution is only able to provide a portion of the required security, thereby increasing the complexity of any security system for electronically stored information, which must be assembled from a number of different technologies. Even with such complicated, advanced security systems, unauthorized intruders such as "hackers" can still penetrate these security systems and access the electronically stored information. Thus, currently available security systems are both complicated to construct and maintain, and are not able to provide a comprehensive, reliable solution to the problem of information security.

In addition, security systems which are known in the art are designed to protect data by screening each interface, or "channel", to the data, thereby requiring many different systems to be assembled in order to provide full security. Furthermore, by attempting to screen multiple channels to data, the probability of overlooking one or more such channels increases significantly, such that the data then becomes vulnerable to access through such channels. Therefore, the success of the security system depends upon the ability of the system administrator to determine all necessary rules for filtering communication or access. Any risk which is overlooked can therefore result in a potential vulnerability of the system. Thus, currently available security systems in the art rely upon the ability to determine risks and vulnerabilities, and to account for every such risk and vulnerability, thereby resulting in complicated security systems.

Certainly, such complicated security systems are difficult, if not impossible, for the average user to understand and to maintain. Such users must trust the system administrator to competently and expertly manage the security system, thereby relinquishing control to the system administrator. However, a security system which could be simply and easily maintained by the average user, such that the average user would have control over his or her own information, would return individual control to each user. In addition, such a security system would also preferably be more robust and secure than existing security solutions. Unfortunately, such a security system is not currently available in the art.

There is thus a need for, and it would be useful to have, a system and a method for secure storage and transfer of electronically stored information, which provides a comprehensive and reliable security solution to the problem of information security for all types of information, regardless of the format or type of information, which is simple to operate and maintain even for the average user such that individual control over data is possible, and which still permits flexible authorized access to the information as needed.

BRIEF DESCRIPTION OF THE DRAWINGS

The foregoing and other objects, aspects and advantages will be better understood from the following detailed description of a preferred embodiment of the invention with reference to the drawings, wherein:

FIG. 2A is a schematic block diagram of a network vault of FIG. 1, showing its isolation, while

SUMMARY OF THE INVENTION

Figure 1:
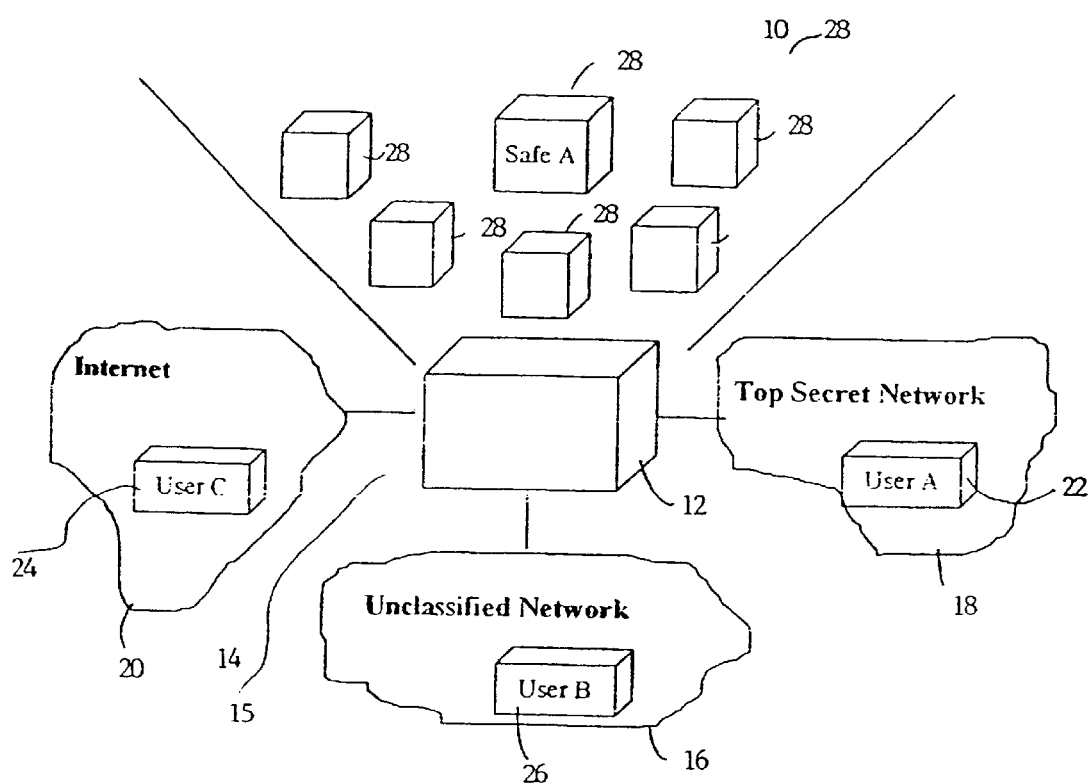
FIG. 1 is a schematic block diagram of an illustrative network vault system according to the present invention.

The present invention is of a system and a method for secure data storage, exchange and/or sharing through a protected central storage facility to which access is controlled through a single data access channel. The storage facility is optionally implemented as a computer server with attached electronic storage hardware, through which at least one software-based "network vault" is operated. The network vault enables data to be stored with only controlled access by authorized user(s) permitted, similar to a physical safe. However, the network vault can be accessed through a network from a remote location, such that the user does not necessarily need to be in the same physical location as the central storage facility in order to place data into, and retrieve data from, the network vault. In this sense, the network vault is similar to a physical safe, in that substantially any type of information can be stored in the network vault, regardless of the format or type of information, and in that the user need only place the information inside the network vault for the information to be secured. Thus, the system and method of the present invention combine the flexibility of data storage and retrieval through a network, with the security of controlled access for data storage and retrieval at a fixed physical location.

The method and system of the present invention have the following advantages over other currently available security solutions in the art. First, the present invention provides much higher security than existing products, yet is useful for any type of information in any type of format and is operable by the average computer user, such that each individual user is able to control access to his or her own data. Such control by the individual user can be described as "distributed security" in the sense that a centralized system administrator for controlling data security is not required. Furthermore, the present invention provides both physical and logical security, unlike other security solutions known in the art.

The high degree of security and simplicity of operation by the user is provided through a number of features, including the single data access channel to the data. This feature is not available among security systems known in the art, which generally attempt to impose a security solution on a computer system which was designed for open and transparent operation so any program and any system service may be used as an interface to the data. Thus, security must rely upon a filtering mechanism.

Such imposed security systems must therefore operate according to a multiplicity of filtering declarations, such that the provided security is only as complete and robust as these declarations. By contrast, the restriction of data access through a single data access channel greatly simplifies the task of protecting access to the data, since only this single channel must be monitored for unauthorized access, rather than monitoring many such channels (or interfaces) as is currently known in the art. Also, the present invention enables data to be exchanged between two users and/or networks which do not trust each other, again by only permitting access to the stored data through the single data access channel, rather than by attempting to filter communication between the two parties. Thus, the present invention is able to provide security without declarations, since the data is moved into the security system, rather than attempting to impose the security system over an existing data access system.

In order to preserve the integrity of the single data access channel, a number of other features of the present invention prevent unauthorized access through any other possible type of interface. For example, as noted previously, the central storage facility is optionally implemented as a computer server with attached electronic storage hardware. Preferably, only software programs implemented according to the present invention are allowed to run on this computer server, thereby preventing unauthorized users from installing "rogue" software programs on the computer server in an attempt to gain access to the data.

Also, preferably the stored data is organized as a collection of files, which are only accessible through a unique filing system. This filing system is preferably not only unique to the present invention, but is also unique for each central storage facility, such that obtaining one such central storage facility would not enable an unauthorized user to learn how to circumvent the security system for other such central storage facilities. Furthermore, no standard software program is able to read the files of the unique filing system, since the unique filing system does not permit such access without special knowledge which is different for each central storage facility. Thus, software programs for accessing files must be individually constructed for each unique filing system according to the special knowledge required to access that individual filing system.

Various additional preferred features of the present invention also increase the security provided. For example, optionally and preferably manual confirmation of access to the data stored in the network vault by one or more owners of the network vault may be required before such access is granted, thereby providing additional control over access to the data. Also, preferably the network vault stores the history of activities within the safe, including the history of different versions of each file stored in the safe, such that the owner of the network vault can see the full history of each file. More preferably, files, including the history of the safe and individual files, cannot be deleted without at least the expiration of a period of time for waiting. Such a waiting period decreases the ability of an unauthorized user to both gain access to the network vault and to mask such unauthorized access to the owner of the network vault. In addition, preferably a visual indication of access to a network vault is provided to the owner of that safe, as well as indication of access to a particular file within that safe. Thus, these preferred features increase control of the information by the owner of the network vault, as well as safeguarding against unauthorized attempts to access the data.

According to the present invention, there is provided a system for controlling access to data by a user, the system comprising: (a) a central storage facility for storing the data, the central storage facility comprising: (i) a hardware storage device for physically storing the data; (ii) a network vault for providing controlled access to the data stored on the hardware storage device, such that the access is provided to the user only if the user is permitted the access to the network vault and such that access to the data is permitted only through the network vault, the network vault determining if the access is permitted according to an identifier of the user and according to an authorization list, such that if the identifier of the user corresponds to an entry on the authorization list, the user is permitted the access to the data of the network vault; and (iii) a single data access channel for connecting to the network vault and for enabling communication with the network vault; (b) a network for connecting to the central storage facility; and (c) at least one user computer for being operated by the user and for being connected to the network, the at least one user computer featuring a client software for interacting with the user, such that the client software accesses the data in the network vault through the single data access channel.

According to still another embodiment of the present invention, there is provided a method for controlling access to data stored in a network vault, the network vault featuring a hardware storage device and a software server for controlling the access to the hardware storage device, the steps of the method being operated by a data processor, the method comprising the steps of: (a) providing a client software on a local computer for the user; (b) logging onto the network vault by the user through the client software by providing an identifier to the network vault; (c) determining if access is permitted to the network vault by the user according to the identifier and an authorization list, such that if the identifier corresponds to an entry on the authorization list, the access is permitted; and (d) if the access is permitted, displaying a status of the network vault to the user.

According to yet another embodiment of the present invention, there is provided a method for securely storing at least one file on a physical storage device, the steps of the method being performed by a data processor, the method comprising the step of: organizing the at least one file on the physical storage device according to a unique organization, such that the at least one file is accessible only according to the unique organization, and such that alternatively the at least one file is inaccessible, such that the at least one file is securely stored.

According to still another embodiment of the present invention, there is provided a method for sharing information between a first party and a second party, the first party not being connected to the second party, the method comprising the steps of: (a) providing a trusted party for being connected to the first party and to the second party; (b) receiving the information from the first party by the trusted party; (c) immediately notifying the second party about the received information by the trusted party; and (d) retrieving the information from the trusted party by the second party, such that the information is continuously shared between the first party and the second party.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the term "user" is the person who operates the GUI interface and interacts with software implemented according to the present invention.

Hereinafter, the term "exchange" also includes the term "share".

DETAILED DESCRIPTION OF THE INVENTION

The present invention is of a system and a method for secure data storage, exchange and/or sharing through a protected central storage facility, containing at least one "network vault" to which access is controlled through a single data access channel, for example through a network from a remote location, such that the user does not necessarily need to be in the same physical location as the central storage facility in order to place data into, and retrieve data from, the network vault. In this sense, the network vault is similar to a physical safe, in that substantially any type of information can be stored in the network vault, regardless of the format of type of information, and in that the user need only place the information inside the network vault for the information to be secured. Thus, the system and method of the present invention combine the flexibility of data storage and retrieval through a network, with the security of controlled access for data storage and retrieval at a fixed physical location.

The method and system of the present invention have the following advantages over other currently available security solutions in the art. First, the present invention provides much higher security than existing products, yet is useful for any type of information in any type of format and is operable by the average computer user, such that each individual user is able to control access to his or her own data. Such control by the individual user can be described as "distributed security" in the sense that a centralized system administrator for controlling data security is not required.

The high degree of security and simplicity of operation by the user is provided through a number of features, including the single data access channel to the data. This feature is not available among security systems known in the art, which generally attempt to impose a security solution on a computer system which was designed for open and transparent operation so any program and any system service may be used as an interface to the data. Thus, security must rely upon a filtering mechanism. Such imposed security systems must therefore operate according to a multiplicity of filtering declarations, such that the provided security is only as complete and robust as these declarations. By contrast, the restriction of data access through a single data access channel greatly simplifies the task of protecting access to the data, since only this single channel must be monitored for unauthorized access, rather than monitoring many such channels (or interfaces) as is currently known in the art. Also, the present invention enables data to be exchanged between two users and/or networks which do not trust each other, again by only permitting access to the stored data through the single data access channel, rather than by attempting to filter communication between the two parties. Thus, the present invention is able to provide security without declarations, since the data is moved into the security system, rather than attempting to impose the security system over an existing data access system.

The principles and operation of a method and system for secure data storage and exchange according to the present invention may be better understood with reference to the drawings and the accompanying description, it being understood that these drawings are given for illustrative purposes only and are not meant to be limiting.

Referring now to the drawings, FIG. 1 is a schematic block diagram of an illustrative network vault system 10 according to the present invention. As shown, network vault system 10 features a central storage facility 12. Central storage facility 12 is an electronic storage facility for storage of information. Central storage facility 12 is optionally a "virtual storage facility", in the sense that central storage facility 12 is not necessarily a single hardware device, nor is a hardware device necessarily dedicated to central storage facility 12. Rather, central storage facility 12 is a combination of electronic storage medium hardware, any hardware components required to access such an electronic storage medium, and software for controlling access to the information stored on the electronic storage medium. Examples of such electronic storage medium hardware include but are not limited to a magnetic storage medium such as a hard disk or a floppy disk drive with floppy disk; flash memory; writable CD-ROM disks with the appropriate CD-ROM drive; and substantially any other type of writable electronic storage medium for storing information. As such electronic storage medium hardware is well known in the art, the selection and implementation of a particular type of hardware could easily be made by one of ordinary skill in the art. Thus, the ensuing description focuses upon central storage facility 12 as implemented in software, it being understood that substantially any suitable hardware could be used in conjunction with central storage facility 12 for the system of the present invention.

One example of a suitable implementation for central storage facility 12 is a computer functioning as a server computer (also referred to herein as a "server"), to which the electronic storage medium hardware would be connected, and through which this storage hardware would be controlled. For this implementation, the server computer and associated hardware could optionally be placed into a physically secure case for added physical security.

Central storage facility 12 stores information, both providing access to the stored information and controlling such access. Optionally, central storage facility 12 could be connected to additional electronic devices for accessing information, such as computers, through a network 14. As shown in FIG. 1, network 14 features three different types of networks: an open access network 16, a limited access network 18 and the Internet 20. These are only intended as examples of the types of networks which may provide a connection to central storage facility 12. Open access network 16 is an example of a network in which information is not classified and protected. By contrast, limited access network 18, which could be a corporate intranet for example, is designed to completely protect information, such that limited access network 18 may not be able to connect to other networks. Internet 20 is of course completely unrestricted. However, although each of these types of networks has different access requirements and security measures, users connected to each type of network can still access information through central storage facility 12.

For example, a user "A" 22 connected to limited access network 18 is able to connect to central storage facility 12, as is a user "B" 26 connected to open access network 16 or a user "C" 24 connected to Internet 20. According to the present invention, user "A" 22 is able to safely and securely exchange information with user "B" 26 and/or user "C" 24, without compromising the security of the information and without providing direct access to limited access network 18, such that packets do not travel between Internet 20 or open access network 16 and limited access network 18. This latter feature is important for information exchange between users which do not necessarily trust each other, such as a commercial organization and its customers, or between networks which should not be connected directly for security reasons, such as limited access network 18 and open access network 16. Thus, the present invention does not require users and/or networks to trust each other in order for secure information exchange to occur.

By contrast, security systems which are known in the art, such as firewalls and proxy servers, can only provide filtering of communication and therefore are not sufficiently robust and secure to permit a direct connection to, and packet exchange with, limited access network 18. Therefore, if a risk is overlooked, the filter will fail. Also, the security of the firewall and/or proxy server itself can be breached, enabling the intruder to change the declarations for filtering in order to permit unauthorized access through the firewall and/or proxy server. However, the present invention does not require such packet exchange across networks, so no such declarations are needed.

Rather, central storage facility 12 features at least one, and most preferably a plurality of, network vaults 28. Each network vault 28 is an isolated storage component for storing information, isolated since each network vault 28 has its own security system, with its own security database and hierarchy. Furthermore, the information related to security logs and authorizations is stored in a separate, isolated location, inaccessible except through the mechanisms provided by the present invention for interacting with network vault 28. Also, network vault 28 has distributed security, in that the owner(s) of each network vault 28 have control over access to network vault 28, unlike other systems known in the art in which control is ceded to a central system administrator who controls data access for a plurality of users. Thus, network vault 28 is "virtual" in the sense that physical separation and physical access control is not required, such that potentially user "A" 22 connected to limited access network 18 and user "B" 26 connected to open access network 16 can both access network vault 28 through their respective networks.

Network vault 28 provides security through isolation of sensitive data. For example, rather than focusing on the security of a general purpose computer connected to a network, which is a complex problem, security for sensitive data can be provided through network vault 28, which is an isolated, special purpose software tool built only for securing and sharing sensitive information. However, two users can still easily and securely share information. For example, user "A" 22 could share information with user "B" 26 through network vault 28, to which both users have access, by placing such information in network vault 28. User "B" 26 could then communicate with network vault 28 to access the information. Optionally and preferably, network vault 28 could include a notification mechanism for notifying user "B" 26 that the information stored in network vault 28 has been changed. Thus, network vault 28 permits secure information exchange, even across non-secure network connections.

Figure 2A:
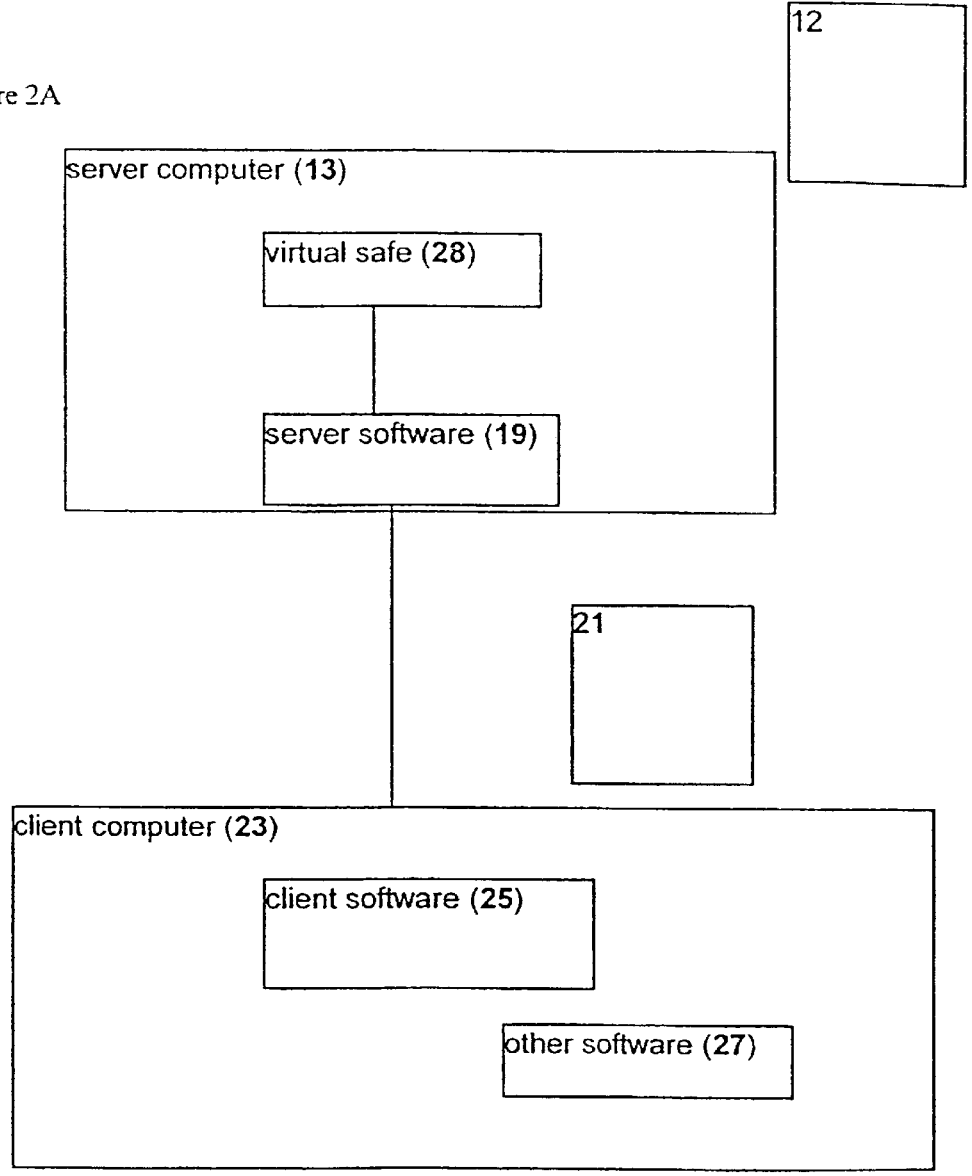

FIG. 2A shows a schematic block diagram of network vault 28 being operated by a server computer 13 for central storage facility 12, illustrating the isolation of the stored data. Server computer 13 is preferably only able to operate security software 19 according to the present invention, which acts as a gateway to network vault 28, such that only a single data access channel to network vault 28 is permitted. Thus, unauthorized users are prevented from installing "rogue" software programs on server computer 13 in an attempt to gain access to the data.

Furthermore, the single data access channel simplifies the operational task of security software 19, since only a single interface to the data stored in network vault 28 must be monitored and controlled. Such a communication channel can in turn be connected to a network 21 which is then connected to a client computer 23. Client computer 23 preferably at least operates a client software 25 according to the present invention for accessing network vault 28 through the single data access channel. Client computer 23 may optionally operate other software programs 27, for example as an adjunct to client software 25 for reading, writing or otherwise manipulating the data stored in network vault 28, or even for purposes unrelated to network vault 28. Thus, substantially no restrictions on the operation of client computer 23 for security purposes are required, since all such restrictions are provided through server computer 13. This feature also simplifies operation of the present invention for the user.

As noted previously, the feature of a single data access channel is not available among security systems known in the art, which generally attempt to impose a security solution on a computer system according to a multiplicity of filtering declarations, such that the provided security is only as complete and robust as these declarations. By contrast, the restriction of data access through a single data access channel greatly simplifies the task of protecting access to the data, since only this single channel must be monitored for unauthorized access, rather than monitoring many such channels (or interfaces) as is currently known in the art. Thus, system 10 of the present invention is both robust and easy to operate by moving the data into network vault 28, to which access is only provided through the single data access channel which is protected by security software 19.

Figure 2B:
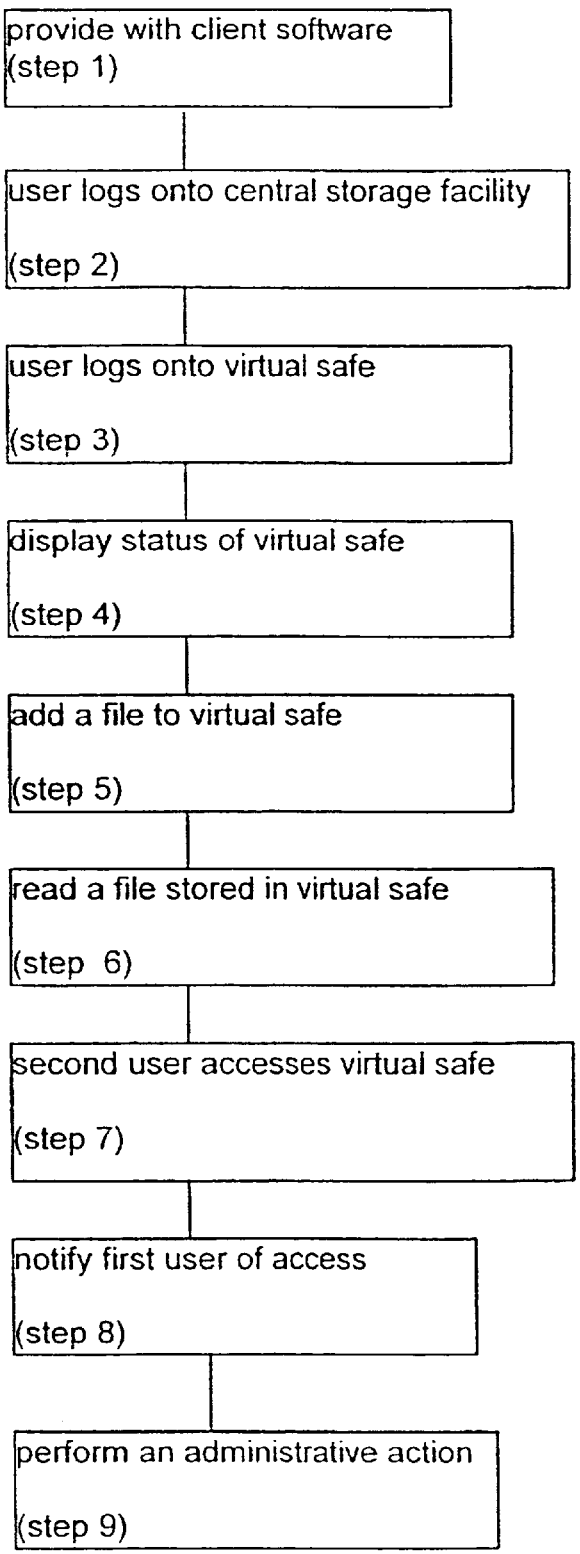
FIG. 2B is a flowchart of an exemplary method for interacting with a network vault according to the present invention.

FIG. 2B is a flowchart of an exemplary method for connecting to, and communicating with, network vault 28.

In step 1, the user is provided with client software on a local computer. This client software provides a GUI (graphical user interface) for user interactions, such that the user can enter commands to network vault 28 and can receive data from network vault 28. In step 2, optionally the user logs onto central storage facility 12, through which access is provided to one or more network vaults 28. The term "logs onto" may optionally include entering some type of identifier, including but not limited to a user name, a password, a key diskette and a smart card, or some combination thereof. The term "key diskette" refers to a floppy disk which must be inserted into the floppy drive of the computer which is operating the client software, in order to provide a physical "key" for accessing central storage facility 12. The smart card, readable through a smart card reader which is also locally connected to the computer which is operating the client software, provides another type of physical "key" for identifying the user. Other types of identifiers include, but are not limited to, various types of biometric identification such as fingerprints and retinal prints. The identifier is then compared to a list authorized users, to determine if the user should be granted access to network vault 28.

In step 3, the user logs onto each network vault 28 to which access is desired and permitted, preferably separately. A similar process for logging on as described in step 2 is preferably implemented to logging onto each network vault 28. The process of step 2 is described as optional when access to central storage facility 12 does not guarantee access to any network vault 28. However, the process of user identification and authentication must at least be performed before access is granted to any network vault 28.

Optionally and preferably, a period of delay may be required before access is granted to network vault 28. Such a delay is preferably implemented when a plurality of users have access to a particular network vault 28, thereby enabling one or more other users to be warned when a user is attempting to access network vault 28. For example, a supervisor may share network vault 28 with one or more subordinates, and hence may wish to determine if a subordinate may access network vault 28. In addition, such a delay could optionally and preferably permit a required confirmation by another user before access is granted to network vault 28. Similar to the previous example, the active acquiescence of the supervisor, through a confirmatory message for example, could be required before the subordinate could access network vault 28.

Also optionally and preferably, for even greater access control, a plurality of users could be collectively required to log onto network vault 28 at one time. Such an option could be required when the plurality of users all need to be in communication with network vault 28 before any access is granted to network vault 28, thereby enabling the plurality of users to actively monitor such access.

Optionally, if a plurality of attempts to gain access to network vault 28 have failed, the physical computer location from which the user is attempting to gain access is suspended from further access attempts, until authorization is granted again by another user or some other reauthorization process has been performed. By only preventing further access attempts from that physical computer location, a user cannot be intentionally completely blocked from gaining access to network vault 28 by another individual, yet security can still be maintained. Also optionally, each network vault 28 may have a list of physical computer locations from which access to network vault 28 is permitted.

In step 4, once access has been granted to network vault 28, the GUI displays to the user the status of each network vault 28 to which access was granted, since the user may optionally have access to a plurality of network vaults 28. The identity and status of each network vault 28 is indicated through the GUI. The term "status" optionally and preferably includes the identity or identities of any other user(s) who are connected to network vault 28, if any. In addition, the status optionally and preferably includes the history of accesses to network vault 28, and more preferably also includes the history of accesses to each file within network vault 28. Each history optionally and preferably includes but is not limited to the identity of the user who connected to network vault 28; the details of such a connection, including the date and time of access, the physical computer location from which access was made, and so forth; changes made to network vault 28 and/or the file within network vault 28, including alterations and deletions; and details of any actions which were denied by network vault 28, for example because the user did not have the requisite permission to perform the action.

Maintaining such a file and network vault 28 history is important to control access to a file and to network vault 28, to know what actions were taken in relation to the file and to network vault 28, to prevent unauthorized use of the file and/or of network vault 28, and to track such access if the need arises at a later date.

More preferably, this history cannot be altered or deleted for a specified period of time, such as a period of n days (n being an integer) after an entry was made in the history. Such a feature prevents intruders from attempting to conceal evidence of unauthorized accesses by deleting the history of such accesses. In addition, preferably files within network vault 28 cannot be deleted before a specified period of time has elapsed. Rather, each file is marked as "deleted" after a delete action has been performed, but the file is not actually removed from network vault 28 until the specified period of time has elapsed. This feature also provides additional security for the information stored in network vault 28. Also, this feature is analogous to showing a (physically) broken safe when such a physical safe is opened by an unauthorized user. Previously, unauthorized accesses to electronically stored information could be masked, for example by deleting the history of such accesses. According to this preferred feature of the present invention, such unauthorized accesses cannot be masked since the history preferably cannot be immediately deleted.

In step 5, the user adds a file to network vault 28. Optionally and preferably, manual confirmation is required for each specific action, such as adding a file, and not just to log into network vault 28. Optionally, this action is performed by "dragging and dropping" an icon representing the file into a folder representing network vault 28 on the GUI being displayed to the user by the client software. Other simple and well-understood techniques may be used to move the file into network vault 28, such as invoking the file "copy" command (or its equivalent) available through the computer operating system according to which the computer of the user is being operated, since network vault 28 is preferably represented to the user as a folder or directory for storing files.

In step 6, the user reads a file within network vault 28. Hereinafter, the term "file" refers to any unit of data within network vault 28, which may include for example a message. Preferably, the file is only stored in the RAM (random access memory) of the computer of the user, thereby avoiding even temporary storage of the file on the hard disk or other permanent storage media of the computer of the user, as described in greater detail below. Storage of the file in RAM greatly increases the difficulty of unauthorized access through the computer of the user. As described in greater detail with regard to FIG. 4 below, manipulation of the file within network vault 28 can be performed with either a specially designed program for interacting with the software modules of central storage facility 12, or alternatively can be performed with standard software which accesses the file through the client software described in greater detail below.

In step 7, optionally a second user also accesses network vault 28. Preferably, in step 8, the first user is notified of the access by the second user, for example through a "watchdog" icon which is displayed through the GUI of the first user. Assuming that the access of the second user is successful, in step 9 the second user is able to read a file within network vault 28. Thus, the first user and the second user can share information without exchange of messages, such that these users do not need to be in direct contact except through network vault 28.

Although the previous discussion concerned the ability to share and exchange information between different users, it is understood that such sharing and exchanging of information could also occur between two software programs, for example, and not just between two users.

Also preferably, in step 9, the first user optional performs some type of administrative action, such as granting access to network vault 28 to another user, for example. The first user is an owner of network vault 28, and as such may change, add or remove user permissions and otherwise administer network vault 28. Thus, no external system administrator is required to administer network vault 28, since each owner of network vault 28 is able to perform these functions.

Figure 3:
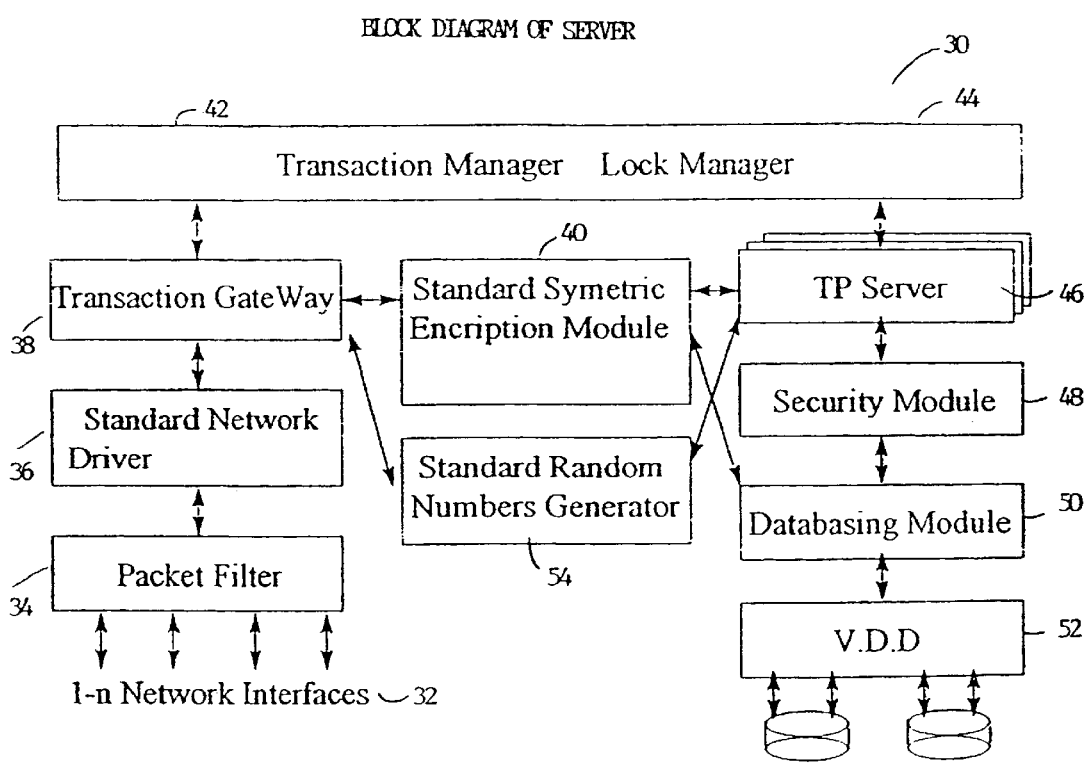
FIG. 3 is a schematic block diagram of an illustrative server for the system of FIG. 1.

FIG. 3 shows a schematic block diagram of an exemplary server according to the present invention, represented as a plurality of software modules. It should be noted that these software modules would be included within central storage facility 12, as previously described for FIG. 1, and enable communication between central storage facility 12 and a client which is operated by the user (see FIG. 4 for a more detailed description of the client). A server 30 features at least one, and preferably a plurality of, network interfaces 32. Each network interface 32 permits a separate connection of central storage facility 12 to a network, as well as enabling separate communication of the network with the software modules of server 30.

As packets are received through network interface 32, these packets are passed through a packet filter 34, which effectively acts as the gatekeeper for the single data access channel to the stored data to which reference was previously made. Packet filter 34 is built as a device driver which sits between the MAC drivers and a network protocol driver 36 (see for example the Microsoft NDIS specification). Network protocol driver 36 can implement any standard network protocol such as TCP/IP for example. Packet filter 34 acts as an internal, dedicated firewall for examining each packet to verify that the packet is targeted only to a network address for central storage facility 12, which is the IP address for the TCP/IP network protocol. Packet filter 34 also verifies that the packet is targeted to the gateway transport address for central storage facility 12, which is the port number for the TCP/IP network protocol. Any packet which does not conform to these rules is immediately dropped. A similar analysis is performed for any outgoing packet which is not being sent from a transaction gateway software module 38.

Filtering prevents any type of packet exchange or other data transfer from outside server 30 to any entity inside other than the software modules of the security system of the present invention. Such filtering prevents the installation of a Trojan horse or other unauthorized program for attempting to exchange packets outside the mechanism provided by the security system. In addition, filtering of the single data access channel protects the stored data from Trojan horses, backdoors, software bugs or other software vulnerabilities, while reducing the complexity of the task for the security system to the regulation of access through the single data access channel.

Transaction gateway software module 38 is an interface for the remaining software components of server 30. Transaction gateway software module 38 performs a number of functions, including authentication of users through any type of key exchange protocol including, but not limited to, SSL (secure socket layer). At the time of logging on to network vault 28 by the user, a two-way authentication (hand-shake) process is performed, based upon a password and optionally upon a key diskette or smart card or various types of biometric identification such as fingerprints and retinal prints, as described in FIG. 2B previously. A one-time encryption key is selected and exchanged between the client and transaction gateway software module 38.

Another function of transaction gateway software module 38 is handling communication activities with the client, including exchanging messages or "transactions" between the client and server 30. These communication activities are based upon a session oriented client/server model for communication, and allow multiple clients to be supported. When a user logs onto a network vault 28, a session is created after the identity of the user has been authenticated as previously described. The one-time encryption key is then used to encrypt any further communication between the client and transaction gateway software module 38. Thus, transaction gateway software module 38 encrypts all messages before sending these messages to the client, and decrypts received messages from the client.

The encryption and decryption processes are performed by a standard symmetric encryption software module 40, which could employ substantially any suitable encryption algorithm. Examples of suitable encryption algorithms include but are not limited to DES and Idea.

Once a received message from the client has been decrypted, the decrypted message is passed to a transaction manager software module 42. Transaction manager software module 42 maintains a transactions queue. Each new transaction is added to this queue, and waits to be selected for execution. A transaction is selected for execution according to priority after the necessary resources become available. Any output created by the transaction during execution is then sent to the client.

Each transaction contains a list of one or more resources which the transaction needs to "lock" for execution. These resources may be locked in share mode (thereby enabling other share requests to be executed in parallel) or in exclusive mode, such that no other requests are permitted for concomitant execution. Resources are locked by a lock manager 44, which can lock a file, a network vault, a record in a table, a user identity for a session and a database, in order to prevent parallel use or updating of these resources when necessary. Lock manager 44 permits the transaction to begin execution only when all of the necessary resources for that transaction have been locked.

One particular type of transaction is a resident transaction, which must wait on the queue until the necessary resources have been updated by another transaction. After execution, the resident transaction is entered to the queue again rather than being purged. The resident transaction is removed from the queue upon receipt of a cancel request from the client. This mechanism allows each client to be immediately updated about any update access (exclusive lock) to one or client resources, and in particular to a file, safe or user identity of the client, without requiring periodic polling of the system by the client. Thus, the mechanism of resident transactions significantly decreases the load on the network and on server 30.

All of these features enable the filing system for organizing the data according to the present invention to be an "active" filing system. Such an active filing system informs the user immediately of any actions which were performed through the filing system, such as accessing a file for example. This notification is performed without continuous polling of the software components being operated through server 30, since the client software on the computer of the user is notified through the active filing system components described previously whenever such access is attempted. In addition, the active filing system is required for two software programs to share or exchange information, in order to notify a software program that such information has been retrieved and is ready for sharing or exchanging with another software program.

When lock manager 44 has approved execution of the transaction, a transaction processing server (TP server) 46 executes the transaction. Preferably, a plurality of such TP servers 46 operate concurrently, for example as threads or processes. Each TP server 46 at least supports the following types of transactions: logging on and off by the user through the client; creating, updating or deleting a network vault or a user identity; storing, fetching and deleting a file or record; listing or deleting the history of a file or safe; adding, updating or removing the identity of the owner of a network vault; and listing the network vault(s) of the requesting user and/or owner(s) of a particular network vault. After the transaction has ended, the output is returned to transaction manager software module 42 and another transaction is selected for execution.

Each request by a transaction to access stored information is passed through a security software module 48. Security software module 48 examines each such request to determine whether the network vault may be accessed by the user through the transaction, including whether the user has permission to perform the transaction to the particular network vault. Since security for each network vault is provided through a separate security environment, each user/owner is able to control access to information without endangering the information of any other network vault.

Security software module 48 preferably operates a separate associated database 50 for each network vault. Preferably, database 50 is a relational database. Database 50 contains such security information as the identity of the owners of the network vault; a list of other users permitted to access the network vault and the associated actions which they are permitted to perform; a security log of actions taken with regard to the network vault; and details of the operation of the network vault. Such administrative information is preferably inaccessible to any program outside the security software of the present invention, since there is no service available for that type of access. Such access would only potentially endanger the integrity of the information.

More preferably, database 50 also stores the information protected by the network vault, in the form of files preferably organized according to a unique file system. This filing system is preferably not only unique to the present invention, but is also unique for each central storage facility 12, such that obtaining one such central storage facility 12 would not enable an unauthorized user to learn how to circumvent the security system for other such central storage facilities 12. Furthermore, no standard software program is able to read the files of the unique filing system, since the unique filing system does not permit such access without special knowledge which is different for each central storage facility 12. Thus, software programs for accessing files must be individually constructed for each unique filing system according to the special knowledge required to access that individual filing system.

This unique file system shares some similarities to known standard file systems such as FAT, HPFS, NTFS and so forth. However, the unique file system has a number of differences. First, the unique file system does not support the standard file access services associated with these standard file systems such as "open", "read", "write" and "close", thereby preventing any access to the stored files from a standard program. Also, the API of the software of the present invention does not provide any mechanism for storing or running other programs on server 30, but only on client 56, thereby preventing an unauthorized program from attempting to circumvent the unique filing system.

In order for the unique filing system to be unique, as previously noted particular knowledge of the system is required before access is enabled. One example of such special knowledge is the organization of the logical and physical blocks. More preferably the logical order of the basic file system blocks, or clusters, is different than the physical order of these clusters. For example, cluster "1" according to the logical order of the file system would actually point to a physical cluster "x" in which "x" is not equal to "1". Preferably the actual mapping of each logical cluster to a physical cluster is random and is separately created for the file system of each central storage facility 12.

Optionally and most preferably, the mapping is stored on an external storage medium such as a floppy diskette, smart card or hard drive, and is required at system initialization. The system then loads this mapping into memory, at which time the external storage medium can be optionally removed and stored in a secured location. Preferably, the external storage medium also contains such information as the cluster size, the encryption key (see below for more description) and other details of the file system.

A virtual disk driver 52 serves the unique file system and is constructed according to the particular characteristics of the operating system of the computer of central storage facility 12 on which virtual disk driver 52 is operated. Virtual disk driver 52 has several differences from standard disk drivers. First, as noted previously, the file system format is loaded at initialization time from the external media and is stored in memory. Next, each request to access a file for a read/write operation contains the logical cluster number and the physical cluster number for that access. If these numbers do not match according to the particular file system operated through virtual disk driver 52, then virtual disk driver 52 rejects the access request. In addition, at the time of initialization, the storage address of the calling program is saved. For each requested access, the address of the calling program is compared to the saved calling program address. If these two addresses do not match, then the request is rejected. Thus, even a specially constructed program would not be able to perform unauthorized accesses in order to obtain information stored in the files.

Server 30 also preferably features a system hook (not shown) for preventing any additional software programs from being operated by central storage facility 12, thereby preventing the installation of a rogue software program for accessing the stored data. This ensures that only one program can run over the secured environment.

Server 30 preferably also features a pseudorandom number generator 54 for generating pseudorandom numbers as part of the process of encryption key generation.

Figure 4:
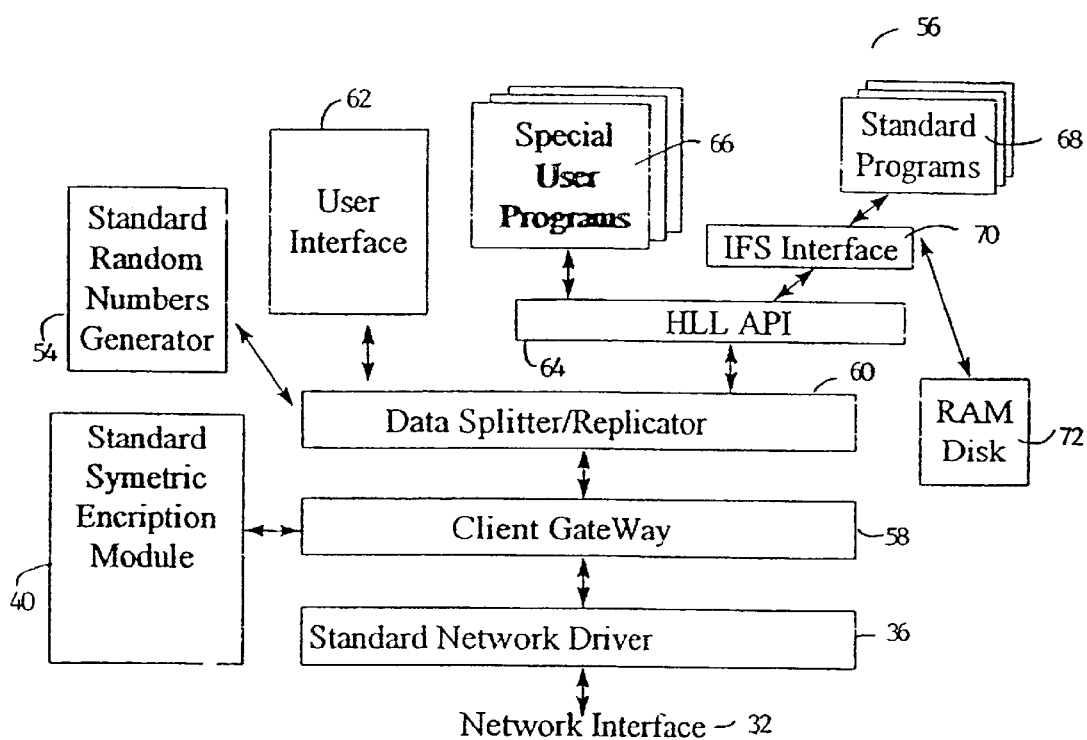
FIG. 4 is a schematic block diagram of an illustrative client for interacting with the server of FIG. 3.

FIG. 4 shows a schematic block diagram of an illustrative implementation of the client for interacting with server 30 of FIG. 3 (not shown). As for the server of FIG. 3, a client 56 features a plurality of software modules which are operated by the computer of the user (not shown). Also as for server 30 of FIG. 3 (not shown), client 56 features network interface 32, network protocol driver 36, standard symmetric encryption software module 40 and pseudorandom number generator 54, performing similar functions for client 56.

Client 56 also features a client gateway software module 58, which is equivalent but mirrored in function to transaction gateway software module 38 of FIG. 3 (not shown). Client gateway software module 58 receives the output of transactions from server 30 (not shown) through network interface 32, decrypts this output and passes the output to a data splitter/replicator software module 60. Client gateway software module 58 also receives requests for transactions from data splitter/replicator software module 60, encrypts these requests and sends the requests through network interface 32 to server 30 (not shown).

Data splitter/replicator software module 60 is an optional but preferred feature of client 56, which enables a network vault to be located on two servers 30 (not shown) for the purposes of data replication or splitting. For data replication, each file is stored on both servers 30, for higher availability of the data. For data splitting, each file is mathematically split into two parts, with each part being stored on one server 30, such that an intruder seeking unauthorized access to the file must obtain such access from both servers 30. Obtaining only one part of the file would render the data meaningless. Thus, both data splitting and data replication provide additional file security.

According to a preferred embodiment of the present invention, the data splitting algorithm is performed as follows. First, the length of the file to be split is determined in bytes, such that the file is n bytes long (n being an integer). Client 56 then requests n bytes from a server "A" (not shown). Server "A" generates these bytes with pseudorandom number generator 54 and sends these bytes to client 56. Server "A" also stores these bytes as a file layer. Client 56 then performs an "exclusive-or" with these bytes and the bytes of the file. The result of this operation is then stored in server "B" (not shown). Now there are two file layers, each having n bytes, each of which is stored on a different server. In order to access the original file, both file layers need to be obtained from the respective servers and combined with the "exclusive-or" operation. Of course, this algorithm could be generalized to more than two servers, such that the file would be split into x file layers stored on x servers (x being an integer greater than one). Thus, the mechanism for file splitting significantly increases the difficulty of obtaining unauthorized access to a file.

From data splitter/replicator software module 60 (if present, and otherwise from client gateway software module 58), messages are accessed by a user interface 62. User interface 62 provides the previously described GUI for the user to perform various activities, including but not limited to, administering network vaults; controlling the activities surrounding the network vaults and the files within the network vaults; opening and closing network vaults; storing, fetching and deleting files; and other user interactions with the system.

A high level language application programming interface (HLL API) 64 enables any program to interact with client 56 and hence with server 30 (not shown) for accessing a network vault. HLL API 64 includes such services as logon, logoff, create network vault, store file and so forth. However, HLL API 64 only provides at least one service for accessing the data itself, and does not provide any service for accessing a central storage facilities file (containing administrative and security information). Two examples of programs which interact with client 56 through HLL API 64 include a special user program 66 and a standard program 68.

Special user program 66 is a software program which is written specially to operate through client 56 in order to store and fetch data to/from server 30 (not shown). Special user program 66 could be written for storing database records and fields and communicating with another user through the network vault, for example.

Standard program 68 is a software program which was not written specially to interact with client 56, such as "off the shelf" word processing programs, for example. If standard program 68 uses standard file commands such as "open", "close", "read" and "write", then standard program 68 can interact with server 30 for accessing a network vault. Standard program 68 interacts with HLL API 64 through an installable file system (IFS) interface 70, which permits interactions to occur according to a standard file system API (application programming interface).

IFS interface 70 is constructed according to the file system interface of the operating system for the computer operating client 56. The file system interface is a standard feature of many commercially available operating systems, such as the "Windows™" operating systems of Microsoft, Inc. (Seattle, Wash., USA), and enables any standard program to access a non-standard file system with standard services. Thus, IFS interface 70 is able to provide these standard file system services.

When a file stored in a network vault is "open", IFS interface 70 fetches the file from server 30 (not shown) and stores the file in a RAM disk 72. RAM disk 72 then temporarily stores the file on the computer which is operating client 56. RAM disk 72 creates the file in memory, writes blocks of data, reads blocks of data, moves the file pointer and deletes the file, thereby supporting the services provided by IFS interface 70. By storing the file on RAM disk 72, rather than even temporarily storing the file on the hard drive of the computer which is operating client 56, the file is more protected from unauthorized access through the computer operating client 56.

The preferred security features of the system of the present invention enable a number of different implementations for the present invention. For example, an ISP (Internet service provider), a bank or any independent party could provide such network vaults to customers, while still permitting the customer to have full control over the information rather than the provider of the network vault services. Thus, the customer would not need to trust the provider of the network vault services.

It will be appreciated that the above descriptions are intended only to serve as examples, and that many other embodiments are possible within the spirit and the scope of the present invention.

What is claimed is:

1. A system for enabling secured data storage and data utilization, said system comprising:

a. a dedicated server computer with a sterile environment such that the only software code that is executable on said dedicated server computer is a network vault security software system;

b. a hardware storage device for storing data, said hardware storage device is accessible only by said dedicated server computer;

c. said network vault security software system, such that said security software system is installed on said dedicated server computer, for providing secure access to said data, said security software system includes an integrated multi-layers security mechanism for securing said data, and a server software mechanism for providing a set of services for managing and utilizing said data;

d. a single data access channel within said sterile environment, such that said single data access channel ensures that only said network vault security software system is permitted to be operated by said dedicated server computer, and such that communication with said dedicated server computer is achievable only through said network vault security software system;

e. a network for connecting at least one user to said secured data storage and data utilization system; and f. client software for communicating with said network vault security software system through said single data access channel, said client software operating on at least one user computer, said user computer operable to connect to said network.

2. The system of claim 1, wherein said data is isolated within said hardware storage device, such that said data is accessible only by said network vault security software system through said single data access channel.

3. The system of claim 1, wherein only said network vault security software system is permitted to be operated by said dedicated server computer, such that any other software program is inoperable by said dedicated server computer.

4. The system of claim 1, wherein said multi-layers security mechanism further comprises:

a. a virtual private network mechanism (VPN) for providing a secured communication channel between said security software system on said dedicated server computer and said client software on said user computer;

b. a packet filter dedicated firewall for preventing any type of packet exchange with said dedicated server computer, other then communication with said security software system in said dedicated server computer;

c. an authentication security layer for providing a two-way authentication hand-shake process between said security software system on said dedicated server computer and said user using said client software on said user computer;

d. an access control security layer for providing controlled access to said data stored on said hardware storage device, such that said access is provided to said user only if said user is authenticated by said authentication security layer, and only if said user is permitted said access according to an access authorization list, such that said access to said data is permitted only through said single data access channel; and e. an encryption layer for encrypting and decrypting said data in said storage device, and for encrypting and decrypting data communicated between said dedicated server computer and said user computer.

5. The system of claim 4, wherein said authentication layer authenticates said user according to a user identifier, said user identifier is selected from a group of identifiers consisting of a password, a key diskette, biometric information and a smart card.

6. The system of claim 4, wherein said access control security layer further provides controlled access to said data, such that said access to said data is provided to said user only after a predefined period of delay, such that a user request to access said data is notified to a predefined plurality of users before said access to said data is permitted.

7. The system of claim 4, wherein said access control security layer further provides controlled access to said data, such that said access to said data is provided to said user only after an approval of said access by at least one user of predefined plurality of users that must approve said access to said data.

8. The system of claim 4, wherein said access control security layer further provides controlled access to said data, such that said access to said data is provided to said user only if predefined plurality of users are collectively connected to said network vault security system, such that said access is notified to all said plurality of users.

9. The system of claim 1, wherein said network vault security software system further provides a history repository, such that said history repository is stored by said network vault security software system on said hardware storage device.

10. The system of claim 9, wherein said history repository includes records of all access attempts to said data, such that each said record cannot be deleted from said history repository for a predetermined period of time.

11. The system of claim 9, wherein said history repository includes all versions of said data, such that each said data version cannot be deleted from said history repository for a predetermined period of time.

12. The system of claim 9, wherein said history repository is continuously updated and changes in said history depository are automatically sent as alerts to all relevant users, such that no periodic polling of the system is required.

13. The system of claim 1, wherein said server software mechanism further comprises:

(1) a network interface for communicating with said client software, said network interface receives packets from said network and sends packets to said network; and (2) a packet filter for forming said single data access channel in combination with said network interface, said packet filter filtering said packets received from said network according to a destination address, such that if said packets do not feature said destination address, said packets are dropped.

14. The system of claim 13, wherein said destination address includes a network address of said dedicated server computer.

15. The system of claim 13, wherein said destination address includes a transport address of said network vault security software system.

16. The system of claim 13, wherein said server software further comprises:

(3) a transaction gateway software module for receiving said packets from said packet filter and for receiving said data from said network vault; and;

(4) an encryption software module for decrypting said packets received by said transaction gateway software module and for encrypting said data received by said transaction gateway software module.

17. The system of claim 13, wherein said server software further comprises:

(5) a transaction manager software module for receiving said decrypted packets from said transaction gateway software module and for determining at least one access request to access said data in said network vault from said decrypted packets.

18. The system of claim 13, wherein said server software further comprises:
(6) a security module for determining if said at least one access request to access said data in said network vault by said user is permitted.

19. The system of claim 18, wherein said security module determines if said at least one access request is permitted, according to said access control security layer of said network vault security software system.

20. The system of claim 13, wherein said server software further comprises:
(7) a unique file system for organizing said data on said hardware storage device according to a unique organization, such that said data is accessible only according to said unique organization.

21. The system of claim 20 wherein said data is organized as a plurality of clusters such that a logical order of said plurality of clusters on said network vault differs from a physical order of said plurality of clusters on said hardware storage device, and wherein said server software further comprises:
(8) a unique file system mapping table to map said logical order of said plurality of clusters on said network vault to said physical order of said plurality of clusters on said hardware storage device; and
(9) a virtual disk driver for accessing said data through said unique file system according to at least one data access request, said virtual disk driver accessing said data only if said at least one data access request contains a logical address for at least one of said plurality of clusters matching a physical address for said at least one of said plurality of clusters, according to said unique file system mapping table.

22. The system of claim 21, wherein said unique file system mapping table is stored on a removable storage medium external to said hardware storage device, such that when said removable storage medium is removed, said logical order of said plurality of clusters remains unknown.

23. The system of claim 1, wherein said single data access channel further comprises:
a. a system hook for preventing any additional software code from being operated by said dedicated server computer, to prevent installation and execution of a rogue software program for accessing said data; and
b. a packet filter which acts as a gatekeeper for said single data access channel, said packet filter blocks any communication with said dedicated server computer other then communication with said security software system, such that incoming packets are permitted only if said packets are targeted to said security software system on said dedicated server computer, and such that outgoing packets are permitted only if said packets are being sent from said security software system on said dedicated server computer.

24. The system of claim 1, wherein said network connects at least one additional user computer to the secured data storage and data utilization system, said additional user computer being operated by at least one additional user, such that said additional user is authenticated by said authentication security layer, said user and said additional user are permitted access to said data in said network vault according to said access control security layer, such that said user and said additional user securely exchange data through said network vault, without requiring communication between said user computer and said additional user computer.

25. The system of claim 24, wherein at least one user is notified by said network vault security software system when said at least one additional user accesses said data on said network vault.

26. The system of claim 24, wherein at least one user is immediately notified by said network vault when said additional user accesses said data of said network vault, such that no periodic polling of the system is required.

27. The system of claim 1, wherein the system further comprises:
a. an additional network for connecting at least one additional user to the secured data storage and data utilization system, such that at least one additional user computer is connected to said additional network, said additional user computer being operated by an additional user, said additional user is authenticated by said authentication security layer, said user and said additional user are permitted access to said data in said network vault according to said access control security layer, wherein said packet filter firewall prevents any packet exchange between said network and said additional network, such that said user and said additional user securely exchange data through said network vault, without requiring communication between said network and said additional network.

28. The system of claim 1, wherein said client software further comprises:
(A) a limited API (application programming interface) for interacting with said server software, such that only said API interacts with said server software, said API providing at least one service for accessing said data, such that said access to said data is provided through said single data access channel; and
(B) at least one user software program for interacting with said user and said API to access said data.

29. The system of claim 1, wherein said client software further comprises:
(C) a RAM (random access memory) disk for receiving said data from said server software and for temporarily storing said data.

30. The system of claim 1, wherein said client software further comprises:
(D) a data replicator software module for providing data replication between at least two network vault systems, for providing higher availability of said data stored on said at least two network vault systems.

31. The system of claim 1, wherein said client software further comprises:
(E) a data splitter software module for splitting at least one file between at least two network vault systems, such that said file is mathematically split into a plurality of parts, such that each said part is meaningless without all other said parts of said file, such that each said part is stored on a different said network vault system, such that access to said file requires all said parts of said file from said at least two network vault systems.

32. The system of claim 31, wherein said data splitter software module further comprises the steps of:

(a) producing a plurality of pseudorandom bytes corresponding to a length of said at least one file;
(b) performing a reversible mathematical operation on said plurality of pseudorandom bytes and said at least one file to obtain a resultant file combination; and
(c) storing said resultant file combination and said plurality of pseudorandom bytes on different said network vault systems, such that said at least one file is accessible only if said at least one file is obtained from said resultant file combination and said plurality of pseudorandom bytes, according to said reversible mathematical operation.

* * * * *